Aug. 29, 1967    W. C. EXLINE ET AL    3,338,255
TEMPERATURE-RESPONSIVE APPARATUS FOR PRESSURE
FLUID POWER SHUT-OFF SYSTEMS FOR ENGINES,
COMPRESSORS AND THE LIKE
Filed Sept. 30, 1963      3 Sheets-Sheet 1
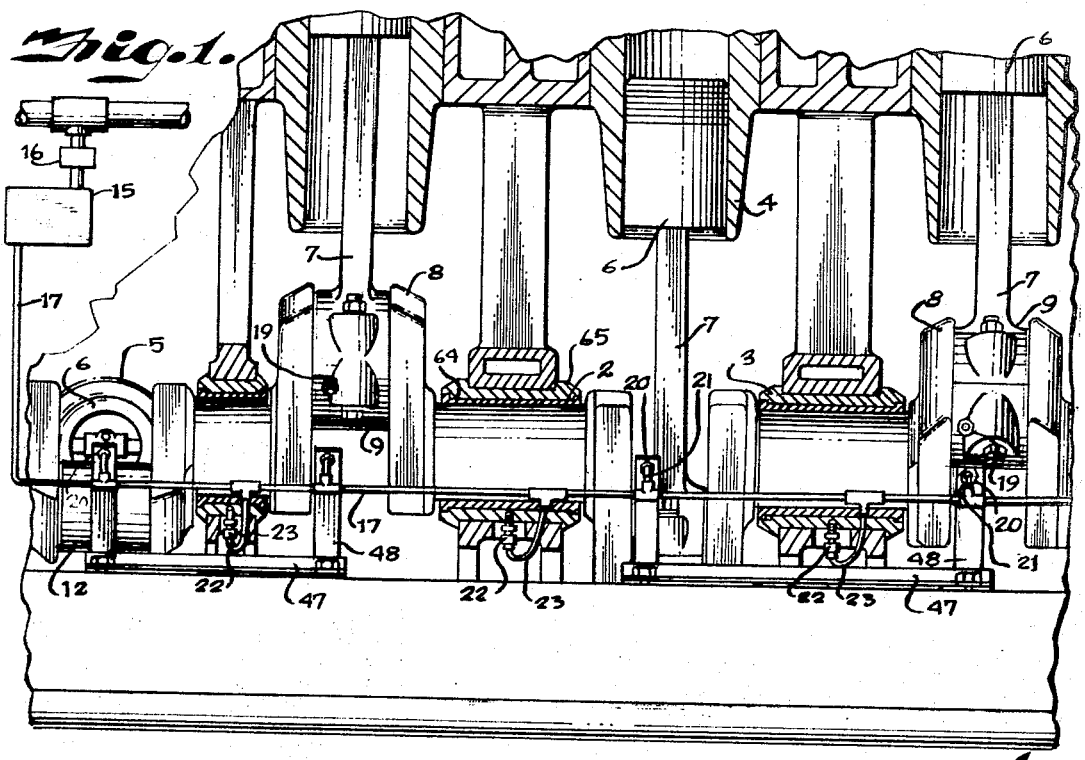
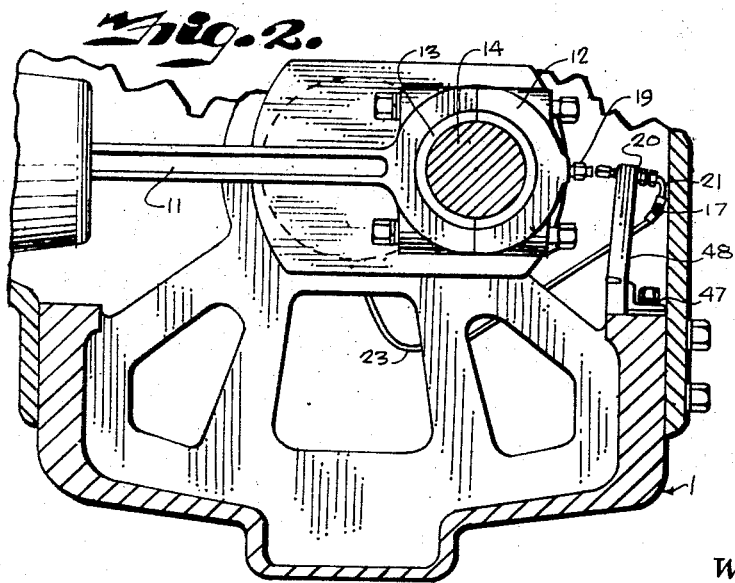
INVENTORS.
WILLIAM C. EXLINE,
CLARENCE S. KENWORTHY
and WILLARD E. WARNER
BY
*Fishburn and Gold*
ATTORNEYS

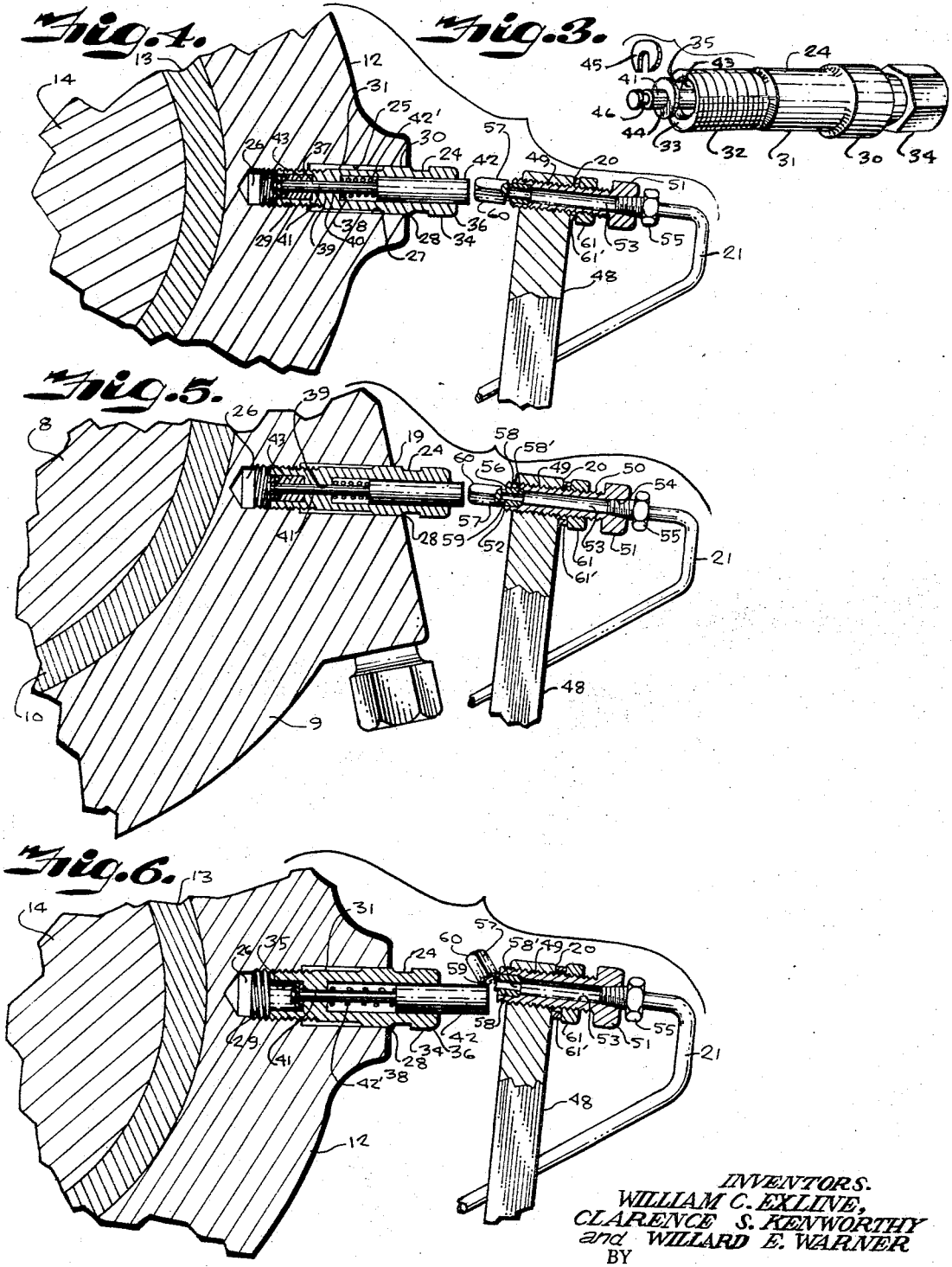

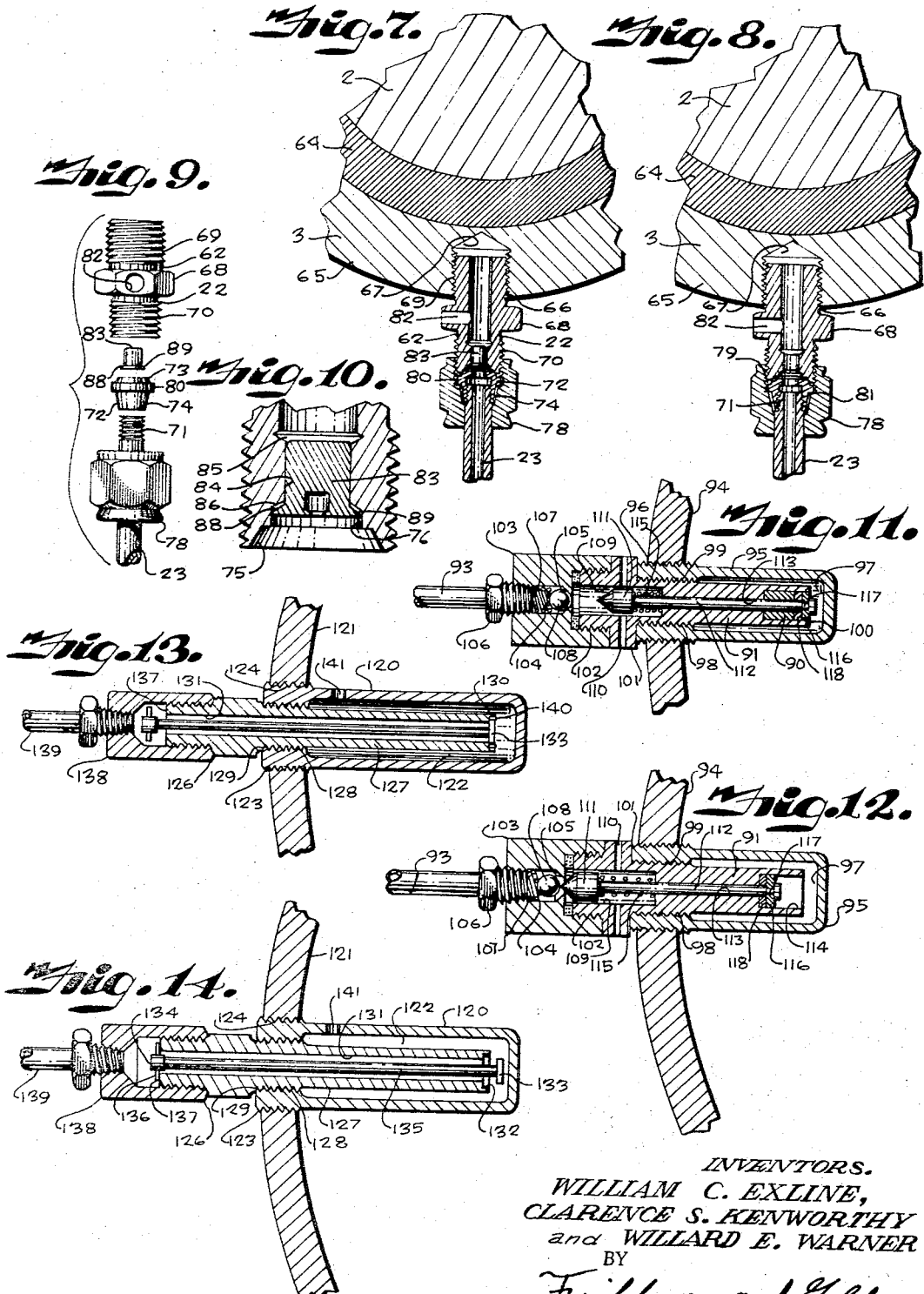

United States Patent Office 3,338,255
Patented Aug. 29, 1967

3,338,255
TEMPERATURE-RESPONSIVE APPARATUS FOR PRESSURE FLUID POWER SHUT-OFF SYSTEMS FOR ENGINES, COMPRESSORS AND THE LIKE
William C. Exline, Salina, Kans., Clarence S. Kenworthy, Evanston, Ill., and Willard E. Warner, Hooker, Okla., assignors to Exline, Inc., Salina, Kans., a corporation of Kansas
Filed Sept. 30, 1963, Ser. No. 312,614
4 Claims. (Cl. 137—74)

This invention relates to temperature-responsive devices particularly useful in connection with operating mechanism that may become damaged by excessive or overheating to signal or initiate stopping of the mechanism, and more particularly to temperature-responsive devices for pressure fluid power shut-off or signal systems for engines, compressors and the like in which a differential fluid pressure with the atmosphere is maintained in a closed system including a power shut-off means which is actuated by opening the system for release of said differential pressure.

Heretofore, power shutdown apparatus using a fluid pressure system have had valves held closed by fusible metal plugs, stops, links or the like which will permit opening of the valves and release the pressure and thereby shut down of the power upon the melting of the stops, links or the like. Variable conditions may be presented by reason of conduction and radiation in the operating mechanism, as for example in the shafts and bearings or other structure which is subjected to heat and to which the valves are attached whereby the rate of temperature increase, or the temperature gradient between the bearing surfaces and the fusible metal stops in the valve, results in the opening of the valves being belated due to slowness of the stops to melt, with the result that damage can occur to the mechanism. Also, structures have been used wherein trigger mechanisms have been connected to moving members such as connecting rods of engines whereby they move by the closure of the fluid pressure system and alteration of the path or orbit of movement, as for example by the failure of a bearing, will result in the trigger striking the closure to break or otherwise effect opening of the pressure system for escape of the pressure therein and shutdown of the power. However, in such structures, the bearing fails before the power shutdown is actuated. Also, some structures use fusible metal which will give way due to softening without actually melting whereby metal pieces are left in the mechanism that can result in later damage.

The principal objects of the present invention are to provide a temperature-responsive apparatus that will overcome the above-mentioned deficiencies of prior structures; to provide a temperature-responsive apparatus and mounting for control of a fluid pneumatic or hydraulic pressure line of a power shutoff or signal apparatus wherein the fusible element is small in bulk and that is melted or disintegrated at substantially a selected predetermined temperature to substantially instantly open the pressure system to release the fluid pressure therein; to provide a power shut-off actuating apparatus wherein a fluid pressure line has a terminal with a breakable closure positioned adjacent a path of a movable member of the mechanism with a temperature-responsive apparatus mounted in said member and having a striker member held in a retracted position by a fusible member and biased to an extended position at which in the path of movement of said movable member the striker will strike the breakable end and open the pressure line; to provide such a structure wherein the temperature-responsive apparatus is mounted in a cavity of the movable member with the fusible member adjacent a bearing member to be fully responsive to the temperature thereof; to provide a temperature-responsive structure adapted to be mounted on a stationary member and having a duct from the pressure system connected therewith with a fusible metal element closing communication with said duct adjacent a coupling therewith for facilitating replacement of said element; to provide such a structure wherein the element has a flanged portion engageable with its mounting to resist movement of the element by the pressure in the system; to provide such a structure wherein an insulating material such as a solid plastic adhesive or the like forms a heat insulation that retards softening and giving away of the fusible element at temperatures below the predetermined melting point at which the fusible element should release or effect opening of the pressure system; to provide a temperature-responsive apparatus wherein communication with the pressure system is closed by a valve and a plunger or striker biased toward valve-opening position is retained in a retracted position by a fusible member positioned in a body exposed to heat whereby temperatures above a predetermined safe maximum temperature effect fusing of the fusible member and release of the plunger to open the valve and thereby release pressure in the fluid pressure power shut-off; to provide a temperature-responsive apparatus wherein the valve is positioned in a body exposed to heat which, if above a critical temperature, should result in shutdown of the power wherein the fluid pressure in the system urges the valve to open position and said valve is held in sealing position by a bond of fusible material; to provide in a machine mechanism having areas in which temperatures over a predetermined maximum may be dangerous with a fusible element in each area positioned to be responsive to the heat in the respective areas and fusible when the area is overheated, a fluid pressure system wherein the pressure holds an actuating element inoperative and a controlling element held by the fusible element to retain the pressure in the system and thereby the actuating element in the inoperative position whereby overheating of the area fuses the fusible element to release the controlling element and the pressure in the system for actuation of said actuating element; and to provide temperature-responsive apparatus for pressure fluid power shut-off systems that are economical to manufacture, easily installed and that are efficient and positive in operation for releasing the pressure for operation of the power shut-off in response to predetermined temperatures in the respective protected areas, said temperature-responsive apparatus having a respective fusible element with a narrow range of temperature for the fusing of said element.

Other objects and advantages of this invention will become apparent from the following description taken in connection with the accompanying drawings wherein are set forth by way of illustration and example certain embodiments of this invention.

FIG. 1 is a side view partially in section of an engine compressor with the invention associated therewith.

FIG. 2 is a partial transverse sectional view through the compressor portion and showing the temperature-responsive apparatus mounted to be responsive to the temperature of the crank pin bearing.

FIG. 3 is a disassembled perspective view of the temperature-responsive apparatus adapted to be mounted in a movable member.

FIG. 4 is an enlarged sectional view through the compressor connecting rod and crank pin bearing with a striker plunger retracted, and a fluid pressure system terminal supported in the path of the striker piston when released.

FIG. 5 is an enlarged sectional view showing a temperature-responsive apparatus and fluid pressure system terminal mounted in the engine connecting rods.

FIG. 6 is a sectional view similar to FIG. 5 with the striker piston released and extended and breaking the end from the fluid pressure terminal.

FIG. 7 is an enlarged sectional view through a temperature-responsive apparatus connected to a fluid pressure system and mounted in a stationary bearing member, as for example the main crank shaft bearing of an engine.

FIG. 8 is a sectional view of the apparatus shown in FIG. 7 after fusing of the fusible element thereof and release of pressure in the fluid pressure system.

FIG. 9 is a disassembled side elevational view of the heat-responsive member shown in FIG. 7.

FIG. 10 is an enlarged partial sectional view through the heat-responsive member and illustrating the arrangement of the fusible element therein.

FIG. 11 is a sectional view through a modified form of temperature-responsive apparatus wherein a valve forms a closure for the fluid pressure system with a movable member biased to open said valve when released, said movable member being held in retracted position by a fusible element.

FIG. 12 is a sectional view similar to FIG. 11 in which the fusible element has melted and released the movable member, opening the valve.

FIG. 13 is a further modified form of temperature-responsive apparatus wherein the fluid pressure system is closed by a valve urged by the pressure to open position, the valve being held in closing position by fusible material surrounding same at the seat and forming a bond thereto.

FIG. 14 is a sectional view similar to FIG. 13 wherein the fusible material is melted and the valve released and in open position.

Referring more in detail to the drawings:

The reference numeral 1 generally designates an operating mechanism such as a portion of the crank case of an engine and compressor having a crank shaft 2 journalled in main bearings 3, said engine having power cylinders 4 and compressor cylinders 5, each cooled in the conventional manner. The engine cylinders have pistons 6 connected by conventional connecting rods 7 with crank pins or throws 8 of the crank shaft. The connecting rods 7 are provided with cap bearing members 9 embracing the crank pin and having a bearing or bushing member 10 providing the bearing engagement with the crank pin. In the structure illustrated, the engine cylinders 4 are arranged in vertical position and the compressor cylinders 5 in horizontal position. The compressor cylinders have connecting rods 11 with the cap portion 12 having a bearing or bushing member 13 arranged to embrace and provide bearing engagement with the respective crank pin 14.

The engine-compressor or mechanism 1 has a power control 15 with power shut-off or signal mechanism 16 and a closed fluid pressure system including lines 17 having a pressure differential with the atmosphere arranged whereby said pressure differential retains the actuating mechanism 16 in inoperative position and release of the pressure differential, as by opening the line 17, releases the actuating mechanism to shut down the power, give a signal, or both. The power shut-off mechanism member 16 may be of any conventional type, and it may operate with a vacuum or sub-atmospheric pressure in the line 17, or it may be arranged whereby the actuating member 16 is held inoperative by superatmospheric pressure of either liquid or gas, as for example 25 pounds per square inch pressure in said line 17. The mechanism, such as an engine and compressor, has a plurality of bearings, points and areas in which the operation subjects them to heat, and temperatures above a predetermined safe maximum may be dangerous whereby continued operation of the mechanism may result in failures of the parts or other expensive damage to the mechanism. Each of the points or areas may have different safe maximum temperatures wherein a temperature-responsive apparatus arranged in the respective locations should respond to the predetermined temperature selected therefor at which the power should be shut off. Even though there are a plurality of temperature-responsive apparatuses and locations, the pressure system has the lines 17 all communicating whereby each of the pressure-responsive apparatuses are connected or arranged to effect a single closed system whereby an excessive temperature at any of the locations will result in opening of the system and the actuating element effecting shutdown of the power.

In the structure illustrated in FIGS. 1 and 2, a pressure-responsive apparatus 19 is arranged on the connecting rod of the compressor cylinder and associated with a terminal 20 of the pressure system 15. Also, temperature-responsive apparatus 19 of the same structure is mounted in the engine connecting rods and associated with terminals 20, the positions, however, varying due to the difference in the orientation of the compressor and engine cylinders. However, each of the terminals 20 are connected by a duct or pipe 21 which is a branch of and communicates with the pressure pipe 17 of the system 15. A pressure-responsive apparatus 22 is arranged at each of the main bearings and such apparatus may be arranged at other heat-sensitive stationary points with each of said apparatus connected by a respective duct 23 which is a branch of and communicates with the main pressure line 17.

The heat-responsive apparatus 19 includes a body member 24 adapted to be secured in a socket 25 that extends into a connecting rod or cap to or adjacent to the bearing member 13 whereby any heat therefrom will be immediately effective in the inner portion 26 of the cavity. In the structure illustrated, the outer portion 27 of the cavity is formed by a cylindrical bore that extends inwardly from an outer opening 28 and terminates in a reduced bore with internal screw threads 29. The body 24 has a cylindrical portion 30 substantially of the size of the bore 27 adjacent the opening 28 whereby when positioned in the cavity the body is supported by said walls of the cavity. Inwardly of the portion 30, the body has a reduced portion 31 terminating in an externally threaded portion 32 adjacent the inner end 33. Outwardly of the portion 30 adjacent the outer end is a portion 34 having an external polygonal shape whereby when the body is positioned in the cavity it may be rotated to screw the externally threaded portion 32 into the threads 29 to secure the body in said cavity. The body 24 has bores 35 and 36 extending from the inner and outer ends respectively axially of the body, said bores terminating in shoulders 37 and 38 respectively that are spaced apart to define a wall portion 39 therebetween having an axial bore 40 of reduced size to slidably mount a stem 41 of a striker plunger member 42. The striker plunger portion slidably fits in the bore 36 and has the stem 41 extending therefrom in the bore 40 and into the bore 35. A spring 42' is sleeved on the stem 41 between the plunger 42 and the inner end of the bore 35 to bias the plunger 42 outwardly of the body 24.

The plunger 42 is normally retained in retracted position by the engagement of the inner portion of the stem 41 with a structure including a fusible metal member or element 43, a washer 44 and a keeper member or horseshoe washer 45. The washer 44 is sleeved on the stem 41 and then the keeper washer engages a shoulder formed by a reduced diameter 46 and the fusible member 43 is between the washer and the shoulder 37 of the bore 35 to hold the striker plunger whereby it cannot be extended from the body member until the fusible metal member 43 is melted or disintegrated. It is preferred that the washer 44 have a diameter whereby it is freely movable in the bore 35 but a close fit to cooperate with the body to enclose the fusible metal member 43. It is preferred that the body and plunger length be such that the distance between the inner end of the socket or bore which is close to the bearing bushing 13 to the fusible metal member 43 is small and substantially the entire temperature of the bearing bushing is effective on said fusible metal element.

The fusible metal element 43 is in the form of a sleeve fashioned from a soft metal alloy which may include tin, lead and bismuth or other low melting alloys compounded whereby it will melt at a predetermined temperature and preferably with a small range between the softening temperature and the melting temperature. Applicant prefers to use an alloy sold under the trademark "CERRO" by Cerro De Pasco Sales Corp., 300 Park Ave., New York 22, N.Y., which is available in compositions for substantially any selected melting points between 140 degrees F. and 500 degrees F. Also, this metal is such that when it fuses it substantially disintegrates into very fine particles and thereby, on cooling, does not form chunks of metal that could cause damage to the machine structure.

As the mechanism is operated and the crank shaft rotates, the portion of the connecting rod connected to the crank pin moves in an orbit with the body 24 and the striker plunger 42 positioned as illustrated in FIG. 4, and the plunger 42 extends outwardly with the end portion moving in a defined orbital path. The power shut-off fluid pressure line 17 with the terminal 20 is arranged adjacent to said path. In the structure illustrated, the terminals 20 are supported on brackets 47 mounted in the crank case with each having a post 48 extending upwardly substantially in the plane of the orbital path of the plunger but spaced outwardly therefrom. The upper end of the post 48 has a threaded bore 49 extending toward said path and the terminal 20 in the illustrated structure includes a body 50 having a polygonal-shaped end 51 with an externally threaded portion 52 extending therefrom. The body has a through bore 53 with one end threaded as at 54 to receive a fitting 55 connecting the pressure line branch 21 thereto. The other end of the body has a counterbore 56 which receives an end closure 57. The closure 57 consists of a plug-like member 58 with a hollow portion 58' sleeved into the counterbore 56 and sweated into place to form a sealed connection. Adjacent to but exteriorly to the end of the body at the counterbore, the plug member 58 has a reduced diameter formed by a groove 59 to cooperate with the hollow structure to form a wall thickness that is thin whereby the outer end portion 60 of the plug 58 may be broken therefrom by a lateral blow. The plug 58 is smaller in diameter than the threaded portion of the body and, therefore, in mounting the terminal 20 a nut 61 is threaded on the body 50 and a lock washer 61' sleeved thereon and then with the plug 58 secured in place the body 50 is screwed into the threaded bore 49 until the end 60 of the plug 58 is adjacent to the outer end of the striker plunger 42 to provide clearance in normal operation but arranged whereby when the fusible element 43 fuses and the striker plunger moves outwardly of the body 24 to the limit by the washer 44 engaging the shoulder 37 of the bore 35, the striker plunger 42 will strike the plug 58 and break the end 60 therefrom, as illustrated in FIG. 6. When the terminal 20 is in proper position, the nut 61 is threaded to engage the lock washer 61' with the post 48 to lock the body of the terminal in the selected position. The branch 21 is then connected to the body by the fitting 55 so that in operation with pressure in the fluid pressure power shut-off, the breaking of the end 60 from the terminal will open the interior of the fluid pressure system to the atmosphere so that the control pressure differential is eliminated and the actuating element is then actuated to shut off the power.

With the structure wherein the portion of the body at the threaded end 29 and the washer 44 substantially enclose the fusible element 43, the entire element is substantially subjected to the same temperature so that upon a rise in temperature in the bearing bushing 13 the element does not give way until it melts. This provides an insulation or protection to the fusible element whereby small portions thereof are not subjected to higher temperatures than other portions which might result in a softening of only a portion and thereby a partial release to where the plunger 42 would strike the terminal end 60 when the bearing temperatures was actually below that at which the shutdown was desired. The enclosing or protection of the fusible element prevents such partial melting and assures that the entire fusible element is subjected to the same temperature so that when melting occurs the entire element melts.

In the structure illustrated in FIG. 5, the temperature-responsive device 19 is mounted in the bearing cap 9 of the connecting rod 8 and, due to the vertical arrangement of the cylinders 4, it is found desirable to arrange the temperature-responsive device 19 so that it is in a side of the bearing cap 9 as this permits the positioning of the post 48 of the bracket 47 to carry the terminal in a similar position to that used for the terminal for the compressor connecting rod assembly. Other than relative position, the structure illustrated in FIG. 5 is the same as that shown in FIG. 4 and operates in the same manner to provide a temperature-responsive protecting arrangement for the bearing in the connecting rod that engages the crank pin. While it is preferred to arrange the terminal end 20 so it is adjustable in the post 48, it is to be understood that it could be fixed relative to the post and the connection of the post to the crank case be made adjustable. Also, the post may be arranged at desired angles, as illustrated in FIG. 2, for the most advantageous positioning of the end 60 to receive a lateral impact to break same when the fusible element 43 is fused and the striking plunger moves outwardly in response to temperatures over a predetermined desired maximum which corresponds to the melting temperature of the fusible element.

In the structure illustrated in FIGS. 7 to 10 inclusive, the pressure system branch 23 is directly connected to a body 62 of a temperature-responsive apparatus 22 which is a structure adapted to be arranged where there are stationary members for mounting, as for example on the main bearing 3 of an engine. In the structure illustrated, the crank shaft 2 is rotatably mounted in a bearing bushing 64 that is mounted in a housing 65 fixed or supported in the crank case structure 1. A threaded socket 66 extends through the wall 65 and terminates as at 67 at or in close proximity to the bearing bushing 64 so that the temperature of the bushing will be immediately reflected by heat in the socket with substantially no temperature differential therebetween.

The temperature-responsive apparatus 22 includes a body 62 that has a polygonal-shaped portion 68 with externally threaded ends 69 and 70 extending therefrom in opposed relation. The threaded end 69 has threads substantially corresponding to the threaded socket 66 whereby the body end is threaded into said socket. The threaded end 70 is adapted to be suitably connected in a pressure-tight joint with the branch 23. In the structure illustrated, the branch 23 is a form of a pipe having a threaded end 71 that is screwed into a ferrule or bushing 72 that has oppositely tapered ends 73 and 74, the tapered end portion 73 being adapted to seat in a tapered end 75 of a bore 76 in the body 62. The tapered end 74 is adapted to seat in a tapered recess 77 in a nut 78 sleeved over the branch 23 and having an internally threaded end 79 adapted to be screwed on the end 70. The ferrule or bushing 72 has an annular flange 80 engaged by a shoulder 81 in the nut 78 whereby when the nut is threaded on the threaded end 70 of the body there is pressure-tight engagement and connection that communicates the interior of the branch 23 with the bore 76 of the body 62. This forms a separable connection that may be easily and quickly made for servicing of the apparatus. The bore 76 extends through the body 62 axially thereof and has communication with a lateral port 82 that extends outwardly through the polygonal-shaped portion 68 whereby the port is exteriorly of the housing 65.

The bore 76 is normally closed by a fusible element or plug 83 arranged in bore-sealing position. In the structure illustrated, the bore 76 includes a reduced portion 84 between the port 82 and the seat 75 with opposite ends of the reduced portion terminating in enlarged portions that form outwardly tapered substantially conical surfaces or shoulders 85 and 86 at the respective ends thereof to form seats for engagement by portions of a fusible element 83. The fusible element, as illustrated in FIGS. 9 and 10, includes a portion that is substantially solid and has a periphery that substantially corresponds to the interior shape and size of the bore reduced portion 84. At one end of the fusible element 83, there is an annular flange 88 that has a tapered face 89 adapted to seat on one of the tapered ends 85 and 86. In the structure illustrated and with superatmospheric pressure in the fluid pressure power control systems, the fusible element is positioned in the reduced bore portion 84 with the flange 88 arranged whereby the face 89 thereof engages the face 86 under pressure in the branch 23 so that said pressure tends to hold the element in place. If a vacuum or subatmospheric pressure were used in the shut-off system, the fusible element would then be inserted from the other end of the body so that the flange face 89 would engage the surface 85 and the pressure differential would again hold the element in engagement tending to effect the seal. While such engagement is an effective seal to hold the pressure, plastic adhesive is placed on the flange 88 and then when the element is placed in the body member the adhesive forms a solid and bonds the fusible element and said body at the engagement of the flange with the respective seat. This solid plastic adhesive not only forms a bond but is a high melting point material that also has a further function of being an insulation around the thin section of the flange to protect same from the heat conducted through the body and preventing premature softening of said flange and release of the element. This arrangement positively holds the fusible element in position so that all of said element is subjected to the heat conducted through the body and when the temperature reaches the fusing temperature of the element it fuses or disintegrates and fully opens the pressure system line for escape of the differential pressure. It is preferred that the body member be made of high heat-conductive material such as brass and that the wall portion between the end of the socket and the bearing bushing be thin whereby the heat readily passes therethrough to maintain a minimum of difference between the temperature of the bearing bushing 64 and that to which the fusible element is subjected. In the event the temperature of the bearing is such that the fusible element fuses, opening the branch 23 to the atmosphere, whereby the power is shut down, after the trouble is corrected the nut 78 is backed off from the body, a new fusible element positioned in the reduced portion 84 of the bore 76, and the nut 78 screwed back on the body end 70 to provide the pressure-tight connection between the branch 23 in the body whereby the structure is again ready to function.

The form of the invention illustrated in FIGS. 11 and 12 also has a heat-responsive apparatus wherein a fusible element 90 is arranged in a body member 91 and a branch 93 from the pressure line of the power shut-off is connected thereto with a closure arranged whereby on fusing of the fusible element 90 the closure is opened for release of the pressure in the power shut-off pressure line. In the structure illustrated, the apparatus is mounted in a wall 94, as for example a water-jacketed cylinder wherein a cup-shaped member 95 is secured in a threaded opening 96 in said wall and extends into the space beyond the wall with the closed end inwardly whereby said cup-shaped member forms a cavity or socket 97 that opens exteriorly of the wall. The body member 91 is elongate with a threaded portion 98 screwed into internal threads 99 in a cup-shaped member with the inner end 100 of said body being adjacent the closed end of the cup-shaped member 95. The outer end of the body has an enlarged portion 101 terminating in a threaded portion 102 on which is secured a fitting 103 having a bore 104 extending inwardly from the outer end and terminating in a valve seat 105. A fitting 106 secures the branch 93 to the fitting 103 in communication with the bore 104 and a spring 107 between the fitting 106 and a valve 108 biases the valve against the seat 105 to close the bore and form a closure for the pressure system. The body 91 has a bore 109 extending inwardly from the outer end that communicates with a lateral port 110 whereby when the valve is in open position fluid pressure from the branch 93 can escape through said lateral port. A plunger or striker 111 is in the bore 109 and has a stem 112 that extends through a bore 113 and is slidable therein to an enlarged bore 114 at the end in the socket 97. A spring 115 biases the plunger 111 to move same to engage the valve 108 and open same, as illustrated in FIG. 12. However, the plunger is normally retained in retracted position by the fusible element 90 sleeved on the stem 112 and retained in place by a keeper 116 engaging a reduced portion 117 of the stem, a washer 118 being interposed between the keeper washer and the fusible element. The plunger member 111 is smaller than the bore 109 so that when the ball valve 108 is unseated the flow can pass the plunger.

With the temperature-responsive apparatus assembled as illustrated in FIG. 11 wherein the fusible element 90, together with the washer 118 and keeper 117, hold the plunger retracted, compressing the spring 115, and with pressure in the power shut-off pressure line with the valve 108 seated, if the temperature in the area surrounding the closed end of the cup member rises above a predetermined desired maximum which is the fusing temperature of the fusible element 90, said element melts or substantially disintegrates, releasing the plunger whereby the spring 115 moves same to open the valve 108 for escape of fluid from the power shut-off system, as illustrated in FIG. 12. The washer 118 engaging the end of the bore 114 also forms a stop to limit movement of the plunger whereby the end thereof will not close the opening at the ball seat 105.

The form of the invention illustrated in FIGS. 13 and 14 is particularly adapted for high temperature application, as for example in exhaust stacks and the like. In this structure, a cup-shaped member 120 is fixed in a wall 121 of an area subjected to high temperatures to form a cavity or socket 122. In the structure illustrated, the cup-shaped member 120 has a threaded portion 123 screwed into a threaded bore 124 whereby the cup-shaped member is mounted in the wall 121 with the closed end of the cup inwardly thereof. Mounted in the cup member 120 to extend into the socket 122 formed thereby is a temperature-responsive apparatus 126 that includes an elongated body 127, said body has an externally threaded portion 128 screwed into internal threads 129 at the outer portion of the cup-shaped member 120. The inner end of said body terminates as at 130 adjacent to and spaced from the closed end of the cup-shaped member. The body has a through axial bore 131 with an enlarged recess 132 at the inner end to receive a valve member or disc-like portion 133 of a flow closure member 134. The closure member includes a stem 135 fixed to the disc member 133 and extending through the bore 131, the stem being longer than the body member and terminating in a stop member 136 adapted to engage the outer end 137 of the body 127 when the disc member is in open position relative to the recess 132. A fitting 138 is connected to the outer end portion of the body member and has connected thereto a branch 139 of the power cut-off pressure line 117 to provide communication with the bore 131 in the body member. Flow therethrough, however, is normally closed by the disc portion or valve 133 being seated in the recess 132, the periphery of the disc 133 being smaller than the outer periphery of the recess 132 to provide a space which is filled with a fusible material 140 that will fuse at a predetermined temperature existing inside of the wall 121 which, when occurs, makes it desirable to have the power shut off. The fusible material surrounds the valve member or disc 133 and forms a bond and seal between same and the body member to hold the pressure in the shut-off system. If, during operation, the temperature in the area defined by the wall 121 should reach the fusing temperature of the element 140, it will melt and the pressure from the branch 139 will cause the valve member to be moved away from the body member to open the passage therethrough, the movement of the valve member being limited by the stop 136 engaging the end 137 of the body member. This will allow the fluid pressure to flow through the body member back through the cup member and out through a lateral port 141 reducing the pressure in the power shut-off system so that the power will be shut down. It is to be understood that each of the fusible elements shown and described may be of a composition arranged to fuse at any particular desired temperature and particularly in the structure illustrated in FIGS. 13 and 14 the temperatures may be quite high, as for example as high as 1200 degrees F., as there are no springs or other portions that would be damaged by such heat.

In some installations, it may be desirable to have two temperature control and responsive systems on the mechanism to be protected. In one system, the temperature-responsive devices would be set to open at a respective temperature which when the part reached that temperature the system would actuate a shut down to stop the mechanism. The other system would have temperature-responsive devices wherein the operating temperature of each would be such that when the respective part reached the temperature the system would be actuated to give a signal or alarm of the condition. This system would advise the unit could continue to operate without serious damage, but the operators should keep a close watch on it or take remedial measures, if possible.

It is to be understood that while we have illustrated and described certain forms of our invention, it is not to be limited to the specific forms or arrangements of parts herein described and shown except insofar as such limitations are included in the claims.

What we claim and desire to secure by Letters Patent is:

1. A temperature-responsive device for use in fluid pressure power shut-off systems of operating mechanisms having parts which are subject to heat and temperatures above a predetermined temperature are unsafe, a tubular body having a longitudinal bore therein and adapted to be positioned in a wall of said heat subject part with one end extending therefrom, said tubular body having means at said one end for connection with a fluid pressure duct of said system, a bleed port in said body exteriorly of said wall and communicating with said bore in spaced relation to said one end, said bore having a reduced portion terminating in a shoulder facing therefrom, a fusible metal plug in said reduced portion and substantially closing same, an integral annular flange on said plug seated against said shoulder seat, said shoulder and flange being arranged relative to said one end of the body whereby the pressure differential between the duct and the atmosphere acts on said plug flange to urge same against said shoulder seat, and cement around said flange to secure same to the body and insulate the flange from heat conducted by the body to prevent softening of the flange at temperatures below said predetermined temperature.

2. A temperature-responsive device for use in fluid pressure power shut-off systems of operating mechanisms having parts which are subject to heat and temperatures above a predetermined temperature are unsafe, a tubular body having a longitudinal bore therein and adapted to be positioned in a wall of said heat subject part with one end extending therefrom, said tubular body having means at said one end for connection with a fluid pressure duct of said system, means spaced from said one end communicating said bore with the atmosphere, means including a fusible metal member normally closing said bore whereby fusing of said fusible member effects opening of the bore for escape of fluid pressure from said duct, and a material bonding a peripheral portion of said fusible metal member to the tubular body and of a higher melting point than said fusible metal member.

3. A temperature-responsive device for use in fluid pressure power shut-off systems of operating mechanisms having parts which are subject to heat and temperatures above a predetermined temperature are unsafe, a tubular body having a longitudinal bore therein and adapted to be positioned in a wall of said heat subject part with one end extending therefrom, said tubular body having means at said one end for connection with a fluid pressure duct of said system, said tubular body having a portion at said bore forming a shoulder, a fusible metal plug in said bore and substantially closing same, an integral annular flange on said plug seated against said shoulder, and cement around said flange to secure same to the body in sealed relation to prevent leakage thereby at temperatures below said predetermined temperature.

4. A temperature-responsive device as set forth in claim 3, wherein the cement is between the flange and the shoulder in adhering relation thereto.

References Cited

UNITED STATES PATENTS

| | | | |
|---|---|---|---|
| 731,801 | 6/1903 | Markle | 184—1 X |
| 768,384 | 8/1904 | Lockwood | 122—504.1 |
| 855,414 | 7/1907 | Rockwell | 123—198 |
| 1,058,993 | 4/1913 | Marvin | 137—72 |
| 1,142,902 | 6/1915 | McNutt | 137—74 X |
| 1,155,932 | 10/1915 | Kessler | 184—1 X |
| 1,498,096 | 6/1924 | Herr | 253—59 |
| 1,675,780 | 7/1928 | Alric | 123—198 |
| 1,746,760 | 2/1930 | Barlow | 123—198 |
| 1,924,417 | 8/1933 | Ryan | 137—72 |
| 2,114,762 | 4/1938 | Edmonds | 220—89 X |
| 2,365,364 | 12/1944 | Temple | 138—89 X |
| 2,413,490 | 12/1946 | Evans | 137—72 |
| 2,435,343 | 2/1948 | Downey | 123—198 |
| 2,501,715 | 3/1950 | Ferguson | 246—169 |
| 2,588,204 | 3/1952 | Cameron | 137—72 |
| 2,655,166 | 10/1953 | Steins et al. | 137—72 |

FOREIGN PATENTS

| | | |
|---|---|---|
| 611,832 | 7/1926 | France. |
| 93,765 | 1938 | Sweden. |

WILLIAM F. O'DEA, Primary Examiner.

LAURENCE V. EFNER, Examiner.

R. GERARD, Assistant Examiner.